No. 744,764. PATENTED NOV. 24, 1903.
W. KATHOL.
FILTERING APPARATUS.
APPLICATION FILED OCT. 4, 1902.
NO MODEL. 2 SHEETS—SHEET 1.
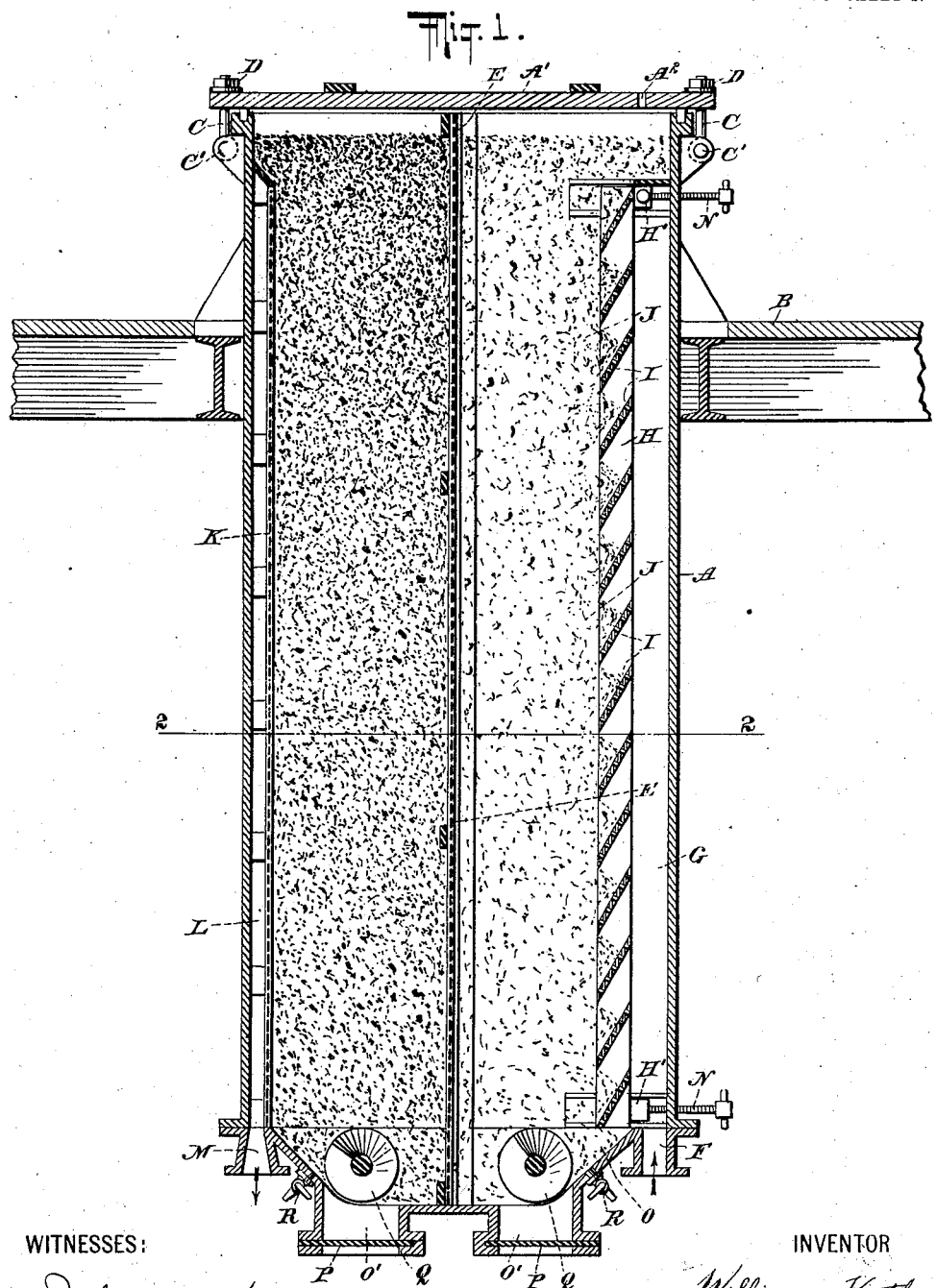
WITNESSES:
INVENTOR
William Kathol
BY Briesen JKrautz
ATTORNEYS No. 744,764. PATENTED NOV. 24, 1903.
W. KATHOL.
FILTERING APPARATUS.
APPLICATION FILED OCT. 4, 1902.
NO MODEL. 2 SHEETS—SHEET 2.
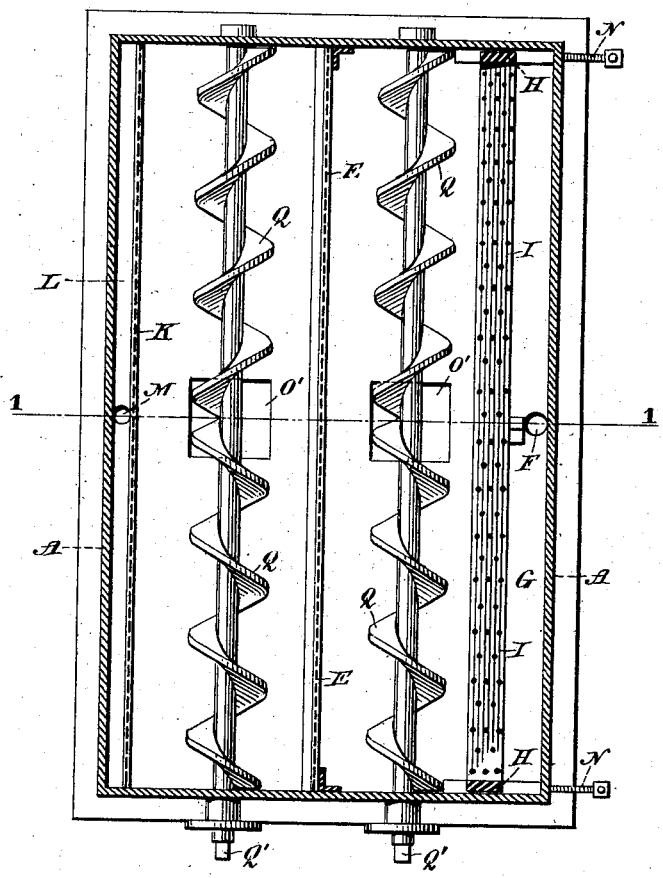
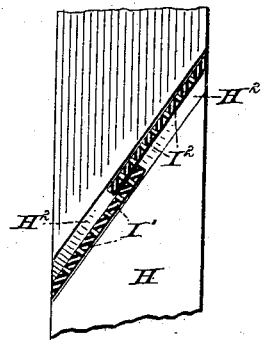
WITNESSES:
John A. Schlenbeck.
John Lotka.
INVENTOR
William Kathol
BY Briesen Knauth
ATTORNEYS No. 744,764. Patented November 24, 1903.

UNITED STATES PATENT OFFICE.

WILLIAM KATHOL, OF VAILSBURG, NEW JERSEY.

FILTERING APPARATUS.

SPECIFICATION forming part of Letters Patent No. 744,764, dated November 24, 1903.

Application filed October 4, 1902. Serial No. 125,861. (No model.)

*To all whom it may concern:*

Be it known that I, WILLIAM KATHOL, a subject of the Emperor of Germany, and a resident of Vailsburg, in the county of Essex and State of New Jersey, have invented certain new and useful Improvements in Filtering Apparatus, of which the following is a specification.

My invention relates to filtering apparatus, and especially to such apparatus of this class which is adapted for use in the treatment of saccharine juices.

The object of my invention is to provide a quick-acting filter which will remain efficient for a very long time and which can be cleaned readily.

Another object of my invention is to provide a filter having a large active surface with a comparatively small volume.

An example of my invention is shown in the accompanying drawings, in which—

Figure 1 is a cross-sectional elevation of the filter, taken on line 1 1 of Fig. 2. Fig. 2 is a sectional plan on line 2 2 of Fig. 1, and Fig. 3 is a detail drawn upon an enlarged scale and showing a slightly different construction of a portion of the filter.

A is the casing of the filter, suitably supported on a floor B or in any other appropriate manner and provided with a cover A' and means for holding said cover down—as, for instance, bolts C, pivoted at C', and nuts D, these bolts being adapted to swing into notches at the edges of the cover A'. Preferably this cover is provided with a vent, as indicated at A². The filter may have a single chamber or a plurality of compartments, and, as shown, two compartments are provided, these being separated by a central perforated partition E. The inlet of the filter is located at the bottom and leads into a vertical inlet-chamber G, which is comparatively narrow. Between this chamber and the partition E (or between this chamber and the filtering material in case no partition is used) is located a peculiarly-constructed support for a portion of the filtering material, which support constitutes an important part of my invention. As shown, the said support comprises standards H, located at the ends of the inlet-chamber G and connected by a series of inclined plates or slats I, which are parallel to each other and have their highest ends adjacent to the chamber G. The construction is therefore similar to that of window-shutters. The slats, however, are perforated, so that the liquid rising in the chamber G may pass through the slats upwardly. The nature of the filtering material depends entirely upon the liquid or solution to be treated, and, according to varying circumstances, charcoal, coke, sand, clay, fibrous substances, or other materials may be used. When a plurality of compartments is produced in the filter, these compartments may contain different filtering materials. Thus in the construction shown the compartment at the right may contain sand and the compartment at the left charcoal. The filtering material J rests partly upon the slats I, and to prevent the material from working out between the slats into the chamber G these slats should be arranged at a slightly-steeper incline than the angle of repose of the particular filtering material. A perforated partition K separates the outlet-compartment L from the last filtering-compartment, and at the bottom of this outlet-compartment is located the outlet M, it being understood that, if desired, a plurality of inlets and outlets might be employed. For the purpose of varying the size of the first filtering-compartment and of the inlet-chamber G, I prefer to so arrange the support H I that it may be adjusted toward and from the inlet F, thus varying the width of the inlet-compartment. Any suitable construction may be employed for this purpose—as, for instance, screws N, having a swivel connection with blocks H' at the ends of the standards H, the said screws fitting into threaded apertures of the casing A. In order to enable the filtering material to be removed entirely or in part, I prefer to arrange at the bottom of each compartment an inclined pocket O, with a central opening O', which is normally closed by a suitable gate, such as a slide P. Above the opening O' a conveyer-screw Q is located in the pocket O, and the threads of this screw run in opposite directions from a point adjacent to the opening O'. This conveyer may be rotated in any suitable manner, as by means of a crank applied to the square outer end Q' of the conveyer-shaft, and it will be understood that when the shaft is turned in the proper direction the entire material contained in the pocket O will be conveyed toward the discharge-aperture O' and will be allowed to escape, provided the gate P is open. Drain-cocks R R may be provided at the pockets O for the purpose of withdrawing any liquid that the filtering material may still contain.

In operation the filtering material being inserted through the top will rest upon the inclined slats I, as shown in Fig. 1, in such a manner that the exposed surface of the filtering material between adjacent slats will be approximately perpendicular to the planes of the slats. Furthermore, since the slats are perforated that portion of the filtering material which rests on the slats will practically form a portion of the exposed or active filtering-surface. It will thus be seen that by employing the inclined perforated slats I secure a considerable increase of the active filtering-surface as compared with a construction in which a simple vertical perforated wall would be used instead of the said inclined slats. As the material to be filtered rises into the inlet-chamber G it at once begins to pass through the filtering material in the two compartments, and thus reaches the outlet-chamber L and the outlet M in a purified condition, being relieved of all suspended matters, such as calcium salts, oils, coloring-matters, or various impurities.

My improved filter is adapted for the treatment of water or of solution—such as, for instance, the saccharine juices which occur in the manufacture of sugar.

I desire it to be clearly understood that the liquid to be filtered does not rise to the top of the inlet-compartment G, but only to a relatively small height within such compartment, at least during the first stages of the operation. As, however, those portions of the filtering material through which the liquid passes gradually become clogged up with the impurities retained, the liquid will automatically seek a higher level, where it can more readily flow through the filtering material. Thus the liquid will, without necessitating any manipulation of the apparatus, rise gradually to the higher unused portions of the apparatus, so that the efficiency of the filter will remain constant. When the liquid reaches the top of the apparatus, the filtering material should be renewed, and this may be done readily through the medium of the conveyer-screws Q, as above described. The adjustability of the support H I relatively to the adjacent wall of the casing A enables me to vary the size of the inlet-compartment G according to the nature of the liquid to be filtered.

In some cases it may be advisable to employ adjustable slats, and Fig. 3 shows a construction for this purpose. Here each slat consists of two portions I' I², arranged to overlap. Preferably the outer slat laps over the inner one. One or both of these slats or slat portions is arranged to slide in its own plane, for which purpose the standards H may be provided with inclined grooves H². Friction and gravity alone in conjunction with the pressure exerted by the filtering material resting on the slats may be relied upon to keep the slats in their desired relative positions, or special mechanical means may be employed to lock the slat-sections to each other after adjustment.

It will be understood that various modifications may be made without departing from the nature of my invention.

What I claim as new, and desire to secure by Letters Patent, is—

1. A filter comprising an upright casing having an inlet and an outlet for the material to be filtered, an inlet at the top for the filtering material, an outlet at the bottom for said filtering material, an upright apertured partition located in the casing and adjustable toward and from the adjacent side wall of the casing, and filtering material engaging said partition.

2. A filter provided with a filtering-chamber having an upright supporting-wall for the filtering material, said wall consisting of superposed inclined slats each of which comprises two overlapping perforated sections one adjustable relatively to the other.

3. A filter provided with a filtering-chamber having an upright supporting-wall for the filtering material, said wall consisting of superposed inclined slats each of which is adjustable in width.

4. In a filter a casing provided with an inlet and an outlet for the material to be filtered, an inlet-compartment with which said inlet connects, a filtering-compartment, and a support for the filtering material, which support separates the inlet-compartment from the filtering-compartment and is adjustable to vary the width of the said compartments, the casing being provided with an inlet for the introduction of filtering material into the filtering compartment, and with an outlet for the removal of said filtering material from said filtering-compartment, both said inlet and outlet of the filtering material being located upon the same side of said adjustable support.

5. In a filter, the combination of a casing having an inlet and an outlet for the material to be filtered, an inlet-compartment communicating with said inlet and located vertically above the same, and a horizontally-adjustable apertured upright support which separates the said inlet-compartment from the chamber containing the filtering material, the casing being provided with an inlet for the introduction of filtering material into the filtering-compartment, and with an outlet for the removal of said filtering material from said filtering-compartment, both said inlet and outlet of the filtering material being located upon the same side of said adjustable support.

6. In a filter, a casing having an inlet and an outlet, a chamber adapted to receive the filtering material and provided with outlets for such material, means for normally closing said outlets, and movable conveying mechanism located at the bottom of the filtering-compartment for directing the filtering material into the outlets of said compartment.

7. A filter provided with a filtering chamber or compartment having an upright supporting-wall for the filtering material, which supporting-wall comprises a series of superposed inclined slats, each consisting of two sections arranged to overlap, one of said sections being slidable in its own plane.

In testimony whereof I have signed my name to this specification in the presence of two subscribing witnesses.

WILLIAM KATHOL.

Witnesses:
JOHN LOTKA,
EUGENE EBLE.